(12) United States Patent
Wong

(10) Patent No.: US 8,862,513 B2
(45) Date of Patent: *Oct. 14, 2014

(54) MOBILE BARCODE GENERATION AND PAYMENT

(71) Applicant: eBay Inc., San Jose, CA (US)

(72) Inventor: Catherine A. Wong, San Ramon, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/094,678

(22) Filed: Dec. 2, 2013

(65) Prior Publication Data

US 2014/0095331 A1   Apr. 3, 2014

Related U.S. Application Data

(63) Continuation of application No. 13/433,792, filed on Mar. 29, 2012, now Pat. No. 8,600,883, which is a continuation-in-part of application No. 12/414,562, filed on Mar. 30, 2009.

(60) Provisional application No. 61/119,328, filed on Dec. 2, 2008.

(51) Int. Cl.
   G06Q 40/00  (2012.01)
   G06Q 30/02  (2012.01)
   G06Q 30/00  (2012.01)
   G06Q 20/22  (2012.01)
   G06Q 30/06  (2012.01)
   G06Q 20/32  (2012.01)

(52) U.S. Cl.
   CPC ........ *G06Q 20/3274* (2013.01); *G06Q 30/0222* (2013.01); *G06Q 30/00* (2013.01); *G06Q 20/22* (2013.01); *G06Q 30/06* (2013.01)
   USPC .......................................................... 705/39

(58) Field of Classification Search
   USPC .......................................................... 705/39
   See application file for complete search history.

(56) References Cited

U.S. PATENT DOCUMENTS 6,199,048 B1   3/2001   Hudetz et al.
(Continued)

FOREIGN PATENT DOCUMENTS

CN   1648950   8/2005
CN   1922623   9/2005
(Continued)

OTHER PUBLICATIONS

NTT DoCoMo, "Coca-Cola, NTT DoCoMo and Itochu Unveil i-mode-Compatible Vending Machine", http://www.nttdocomo.com/pr/2001/000740.html, Aug. 8, 2001, 6 pages.

(Continued)

*Primary Examiner* — Thomas M Hammond, III
(74) *Attorney, Agent, or Firm* — Haynes and Boone, LLP

(57) ABSTRACT

An application on user's mobile device (having a display screen) generates a transaction-specific barcode on the display, where the barcode contains a plurality of funding sources for the transaction and/or merchant loyalty, reward, or membership numbers. The barcode can be scanned to make purchases at a point of sale (POS).

21 Claims, 9 Drawing Sheets

(56) References Cited

U.S. PATENT DOCUMENTS

| | | |
|---|---|---|
| 6,925,439 B1 | 8/2005 | Pitroda |
| 7,810,720 B2 | 10/2010 | Lovett |
| 2001/0051915 A1 | 12/2001 | Ueno et al. |
| 2002/0023027 A1 | 2/2002 | Simonds |
| 2003/0233276 A1 | 12/2003 | Pearlman et al. |
| 2006/0080111 A1 | 4/2006 | Homeier-Beals |
| 2006/0111967 A1 | 5/2006 | Forbes |
| 2008/0133366 A1 | 6/2008 | Evans et al. |
| 2010/0042517 A1 | 2/2010 | Paintin et al. |

FOREIGN PATENT DOCUMENTS

| | | |
|---|---|---|
| CN | 1722163 | 1/2006 |
| EP | 1551140 | 7/2005 |
| JP | 2008040890 | 2/2008 |
| KR | 20020035292 | 5/2002 |
| KR | 20020065746 | 8/2002 |
| WO | WO 02/15062 | 2/2002 |

OTHER PUBLICATIONS

NEOMEDIA, "Welcome to NEOMEDIA Technologies", http://www.neom.com/index/php, 2009, 14 pages.

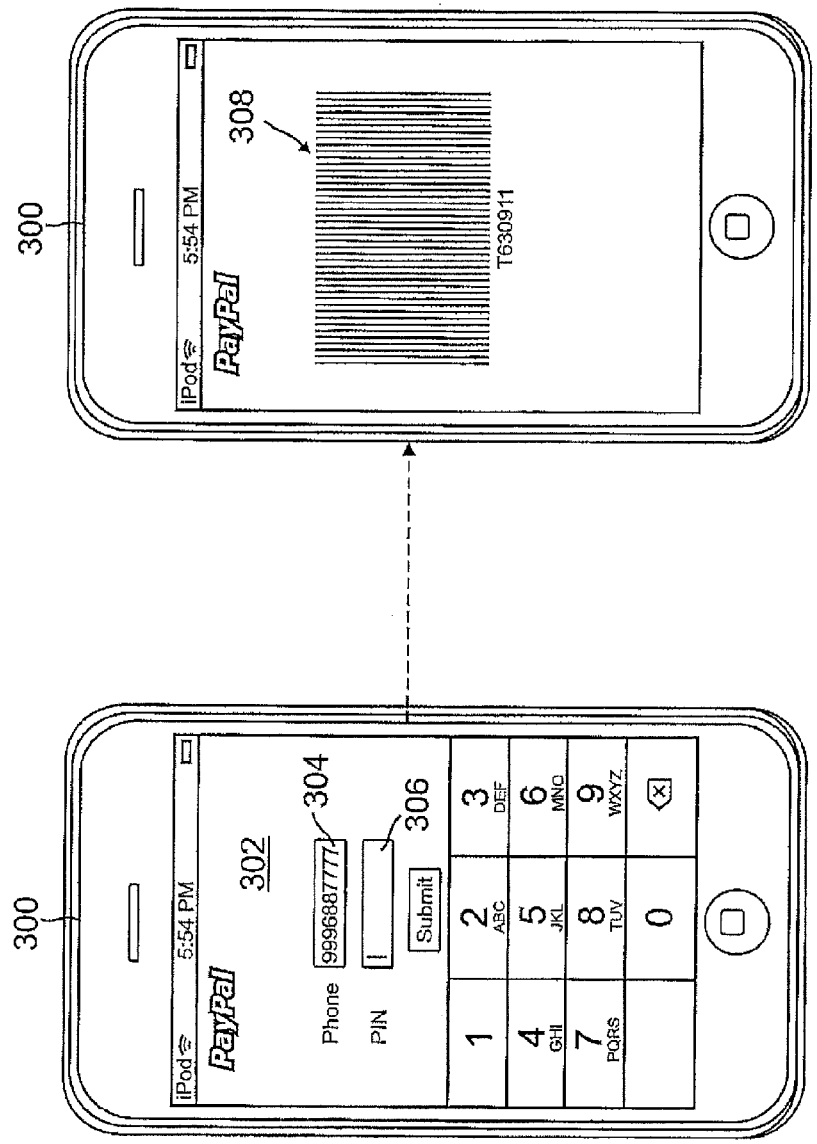

MOBILE BARCODE GENERATION AND PAYMENT

CROSS REFERENCE TO RELATED APPLICATIONS

This application is a continuation of U.S. patent application Ser. No. 13/433,792, filed Mar. 29, 2012, which is a continuation-in-part application of U.S. patent application Ser. No. 12/414,562, filed Mar. 30, 2009, which claims priority to U.S. Provisional Application Ser. No. 61/119,328, filed Dec. 2, 2008, which are all incorporated by reference in their entirely.

BACKGROUND

1. Field of the Invention

The present invention generally relates to facilitating financial transactions and more particularly to facilitating such transactions with a mobile device.

2. Related Art

Mobile devices, such as cell phones, are being used by more and more people world-wide. In addition to using mobile phones for voice calls, consumers can communicate nearly anytime and anywhere to facilitate information access to mobile services and the Internet. Mobile phones have also become multimedia computing platforms with integral digital cameras for taking pictures and video, playing music, recording conversations, and organizing and planning activities and appointments.

More recently, mobile phones have been used in conjunction with on-line payment service providers, such as PayPal, Inc. of San Jose, Calif. With the ever-increasing popularity of the Internet and of Internet commerce, both consumers and sellers are using the Internet to facilitate financial transactions between parties, whether they are individuals or companies. In on-line financial transactions, consumers may use an on-line payment provider to transfer money and receive money over electronic networks, such as the Internet. The money transfer may be for payment of goods or services. The payment providers supply an infra-structure, software, and services that enable users to make and receive payments. Mobile phone users may contract with a payment provider to allow the user to make payments over the phone. Typically, this requires the user to open up an application on the phone, such as through a web browser. The user then accesses his or her on-line account by entering requested information, such as a user name, phone number, email, and/or password. Payment information can then be entered and transmitted to the payment provider, who then transfers funds from the user's account to the payee's account. A confirmation may then be sent to the payer and/or the payee.

While this service gives the consumer flexibility in paying for services anywhere using a mobile phone, the procedure can be cumbersome, time-consuming, and may be prone to fraudulent transfers.

SUMMARY

According to one embodiment, an application on a mobile device having a screen, such as a cell phone, enables the user to generate a barcode on the screen, which can be scanned for payment. The barcode is valid for a limited period of time (e.g., one minute) and for a single use. Once scanned, payment is transferred from the user's account to the merchant's account. In one embodiment, the user first opens up the application on the phone, which then presents the user with a screen showing a phone number associated with the user and a field for the user to enter a password or PIN. After entering a correct password or PIN, a barcode is generated and appears on the screen. The barcode is generated through a payment provider, such as PayPal. Once the barcode is generated, a scanner, such as a CCD scanner, scans the barcode at the point of sale (POS) or other physical payment location. Funds are deducted from the user's account and transferred to the retailer's account. The user may be asked for a signature confirmation. A receipt can then be generated on the mobile device, and purchases tracked immediately.

According to another embodiment, a receipt can be displayed on the user's mobile device for performing a refund transaction. The receipt is located on the user's mobile device, using any suitable search, such as by date, recent activity, store, etc. The receipt may have been stored as part of a purchase described above. Once located, the receipt, in the form of a scannable barcode, is displayed on the user's device. The receipt is then scanned, either by the merchant or user. The returned merchandise can be scanned before or after the receipt is scanned. Once both the returned merchandise and the receipt are scanned, the information is compared to ensure that the receipt matches the returned merchandise. If the refund is approved, the payment provider transfers the appropriate funds from the merchant's account to the user's account. The merchant and/or user may then be given a receipt, either electronically or in printable/paper form.

Other scannable financial products may also be generated, such as a virtual debit/credit card, coupons, and gift cards. If a qualifying purchase provides the user with an instant coupon or rebate, those can be generated as well.

As a result, users can easily and safely pay for transaction using their mobile phone at any location having a suitable scanning device. The user is provided with an alternate or additional vehicle for payment. The user does not need to worry about carrying and managing numerous physical payment means, such as cards, paper coupons, paper gift certificates, etc. Purchases can be instantly categorized and tracked via the phone, and receipts instantly available. For merchants or retailers, this new form of payment may increase sales and volume due to the ability of consumers to have an easy and new way to purchase items. The cost to merchants and retailers may be minimal, as existing scanning systems may be used or simply modified.

In another embodiment, the generated barcode contains a mix of funding instruments for the payment transaction. When the user "checks in" with the payment provider, such as by launching an app and entering login credentials, the payment provider retrieves user information as well as location or merchant information and pushes all available funding instruments to the user's digital wallet or phone. Examples of funding instruments include coupons, rebates, gift cards, reward points, etc. Any loyalty or membership information with the merchant can also be pushed to the user's wallet.

When the user is ready to pay, transaction information may be sent, either by the user device or the merchant, to the payment provider. Transaction information includes details of items to be purchased. The payment provider can then determine which funding instruments are available for the transaction and generates a one-time use barcode (such as QR code) on the user device that includes some or all the funding instruments or sources available. The choice of funding sources can be determined solely by the payment provider, solely by the user, or a combination of both.

The merchant then scans the generated barcode for payment. A total is presented to the user, with all intended funding sources applied. The user can then approve and complete the purchase. In another embodiment, if any and all restrictions/limitations on the barcode are met, the payment may be completed without the user having to authorize. Any loyalty cards can also be conveyed to the merchant for processing any rewards or points to the cards.

As a result, the user can make a purchase with a barcode that contains multiple funding sources, as well as convey store loyalty card information to the merchant, with a single scan of a barcode by the merchant. A receipt can be generated and stored, as with the embodiment above.

These and other features and advantages of the present invention will be more readily apparent from the detailed description of the embodiments set forth below taken in conjunction with the accompanying drawings.

BRIEF DESCRIPTION OF THE FIGURES

FIGS. 3A and 3B show a barcode generated from a mobile phone according to one embodiment.

Figure 1:
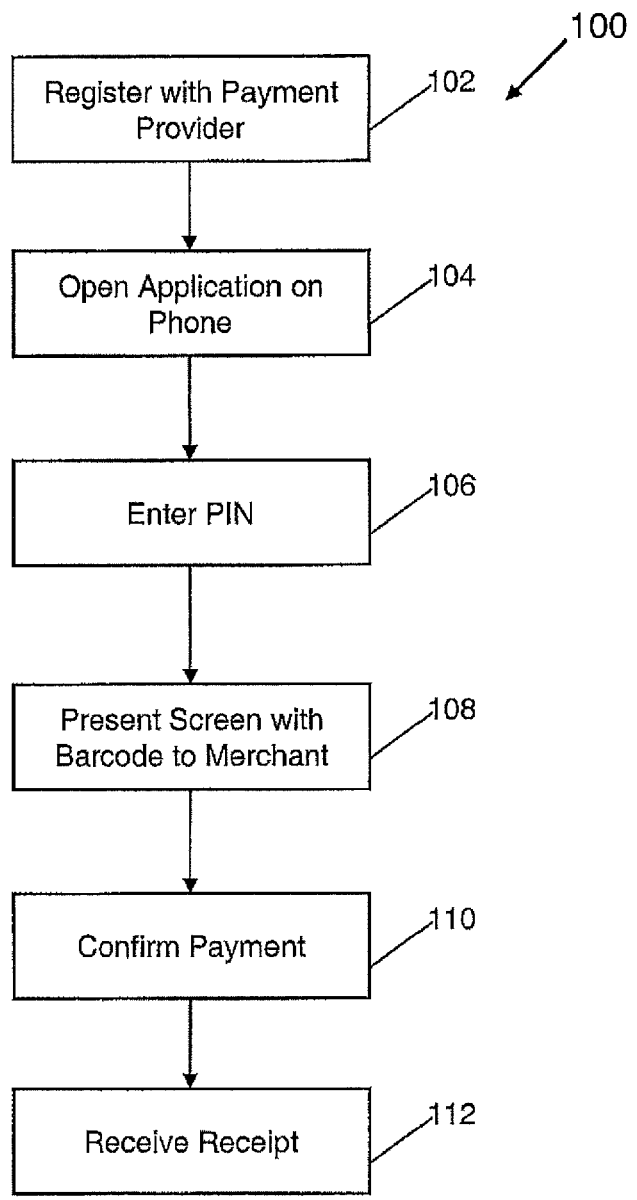
FIG. 1 is a flowchart showing steps for a user to make a payment from a mobile phone according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

FIG. 1 is a flowchart 100 showing one embodiment for a user to make a payment from a mobile phone. In step 102, a user registers with an on-line payment provider, such as PayPal. Registration can be through any suitable means, such as accessing the payment provider site and entering the required information. For example, the user may be asked to create an account if one has not already been established, or if an account is established, to fund the account if needed. The user may then be asked to enter the phone number of the mobile phone and a password or PIN, followed by a confirmation of that password or PIN. Once the user has completed registration, an application can be installed on the user's registered device, such as a mobile phone. When the user is ready to use the service or application, the user opens up the application at step 104, such as by tapping on the application icon on the phone. The user is then presented with a screen showing two fields, a phone number field and a password or PIN field. In one embodiment, the device phone number is already entered. Note that other identifier fields may be used, in any suitable combination, as long as the payment provider is provided sufficient information to authenticate the user. In step 106, the user enters the PIN (or any other requested identification information). If the PIN and phone number are verified by the payment provider, the user is presented with a screen showing a barcode.

In step 108, the user presents the barcode image to the merchant. This may be at a checkout stand or point of sale (POS) after the user has finished shopping and the items (and/or services) for purchase have been scanned or entered for payment. A total is presented to the user, at which point, the user provides the merchant a form of payment. In one embodiment, the user displays the barcode for the merchant to scan. The merchant then scans the barcode for payment. In another embodiment, the user may scan the barcode himself, such as by passing the screen through a scanner. Note that a suitable scanner system and type may be required depending on the device showing the barcode. For example, a CCD scanner may be needed to accurately scan a device having a reflective screen, such as on a phone. After scanning, the user may be given the option, in step 110, of confirming the payment, such as with a signature, checking an "accept" icon, etc.

The merchant is then notified whether the payment was approved. Approval may be in the form of the payment provider transmitting, and the merchant receiving, a text message, such as "Approved," a visual message, such as a green light, a verbal message, such as from a live or automated call to the merchant, or any other suitable indication of approval. Denial of the payment may be indicated in similar ways, such as "Denied," a red light, etc. Denial of the payment may result from various reasons, such as insufficient funds in the user's account to make the purchase or payment, an error in reading the barcode, or an invalid barcode. If the denial is from an error in reading, the merchant may be notified accordingly and the barcode re-scanned as needed. If the denial is from an invalid barcode, the barcode may have expired or been used already. If denied, an indication of the reason may be given to the merchant and/or the user so that the reason can be addressed. For example, if the denial is an invalid barcode, the barcode may be scanned again, or a new barcode may be generated for scanning.

In one embodiment, the barcode generated on the user's phone is valid for only one use (e.g., one confirmed use, where the single use may be from multiple unsuccessful scans and one successful scan) and a specific amount of time. For example, the barcode may only be valid for 30 seconds or one minute after the barcode is generated. This increases security and minimizes misuse or fraudulent use of the barcode.

Assuming the barcode is valid and confirmed, the payment is concluded, and the user is given a receipt at step 112, such as from the merchant terminal in the form of a paper receipt or Short Message Service (SMS) message to the phone. In other embodiments, the user may also view a receipt on the phone and manage or otherwise track the purchase through the payment provider. For example, the user may make notes about the purchase for future reference or send the purchase to another application. The user can also check previous transactions and view or cancel pending authorizations. Note that in some embodiments, the user can easily cancel this service completely, such as when the phone is lost. For example, the user can simply log onto the payment provider site, enter information to access the account, and then cancel the service. Another security feature may be that the user is required to first unlock the phone before use. This can be done in various ways, such as biometric scan or entering an ID to unlock the phone. For the latter, the user is then required to enter two passwords or PINS, one for unlocking the phone and one for accessing the application.

Figure 2A:
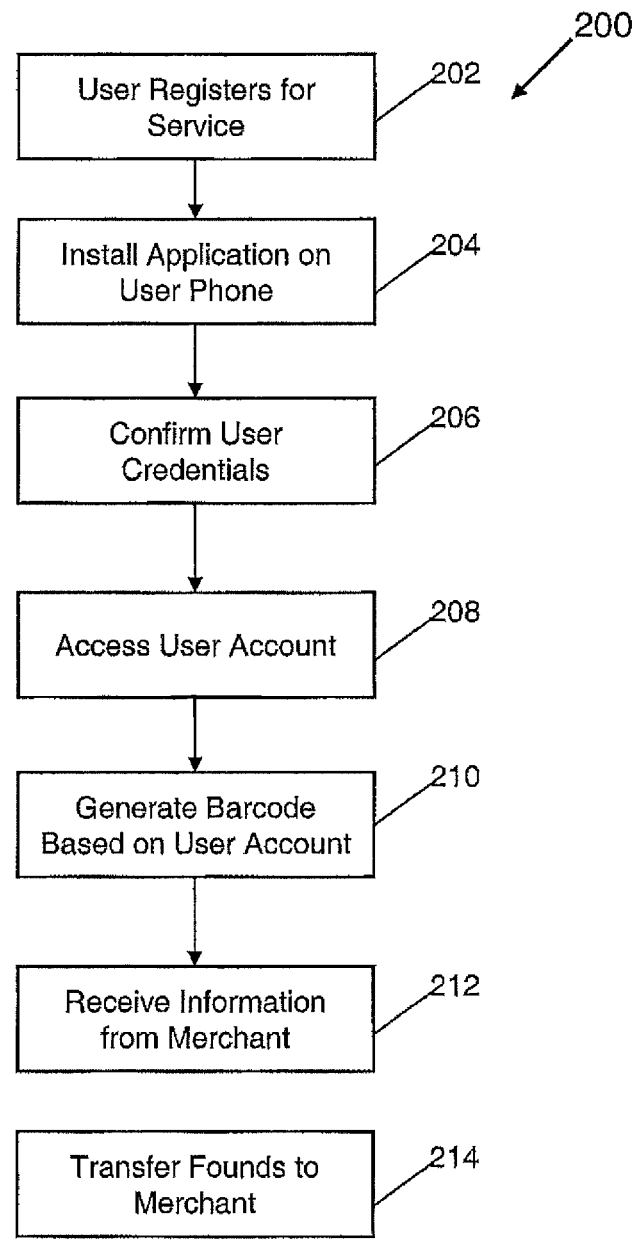
FIG. 2A is a flowchart showing steps for a payment provider to enable a user to make a payment from a mobile phone according to one embodiment.

FIG. 2A is a flowchart 200 showing another embodiment of steps for a payment provider to enable a user to make a payment from a mobile phone. In step 202, the user registers for service with the payment provider. The payment provider receives and processes information entered by the user to create the application and account if necessary. The information may include a user name, password, financial information, billing address, PIN, security questions and answers, etc. Communication of the information may be by any means, such as through the Internet, Bluetooth, or a wired connection, using suitable components such as antennas and processors. Next, the payment provider installs the appropriate application on the user's device in step 204, which can be done via a web browser. The application may simply be an icon on the user's device screen. When the user is ready to use the application or service, the user opens the application and enters requested information as discussed above. The payment provider receives this information to confirm the user in step 206. If the information (e.g., phone number and PIN) does not correspond to a registered user, the payment provider may notify the user accordingly for more chances to login. Once the user is confirmed, the payment provider accesses the user's account at step 208.

At step 210, the payment provider generates a barcode corresponding to the user's account. The barcode can be generated with standard software for display on a screen or terminal, such as through a processor running the software. The barcode may allow access to all the funds in a user's account, only a portion set aside by the user, or be restricted to certain merchants or products/services. For example, a parent may set up an account for a child with limits and restrictions for use. Restrictions may include a maximum amount per transaction or barcode generation, a maximum number of transactions per time period (e.g., week or month), maximum dollar amount of transactions per time period (e.g., week or month), and a pre-determined expiration date of the agreement, such that after expiration, the user can no longer generate the barcodes, unless the user renews the agreement. The barcode may also be for a specific amount, as specified by the user after accessing the application. For example, after access, the user may be given an option of entering the amount, selecting from one of several pre-defined amounts, or using a default amount. Restrictions may also be applied to limit the amount of funds for a particular merchant or potential purchase, such as a stranger at a flea market or from an online want-ad service.

Once the barcode is generated, the payment provider transmits the barcode to the user device, which displays the barcode on the device. Transmission of the barcode can be by the same or similar means as used to receive information from the user, e.g., antenna, transmitter, or transceiver. The payment provider then waits for information from the merchant or scanner. This information may include the merchant's name, account information, payment amount, etc. When the information is received at step 212, the payment provider determines whether the received information will allow the payment provider to make the transfer. As discussed above, information that will make the payment provider deny the payment can include a requested payment exceeding the barcode limit, an expired or already used barcode, a barcode not matching the one for the user, an unrecognized merchant account, etc. If the received information is proper, the payment provider affects a transfer of funds from the user's account to the merchant's account in step 214, with protocols and software executed by processors such as used by PayPal and other on-line financial institutions. The payment provider may also send a confirmation to both the user and merchant that funds have been transferred. Confirmation may be the same for the user and merchant or different, and may include a text message, a visual indicator, a voice indicator, etc.

In another embodiment, the payment provider may provide an additional layer of protection for the merchant, e.g., to minimize charge backs and/or obtain proof of user signature or consent. Initially, the merchant scans the generated barcode with a scanner, such as described above. The POS software at the merchant location then makes a DoAuthorization API call to the payment provider to authorize the payment. In response, the payment provider determines whether the scanned information is consistent with the payment provider information for the user and responds with an authorization or decline to the merchant. If authorized, the merchant can then display the amount for the user to authorize. This can be on an electronic signature pad for the user to sign or just an OK button for the user to press. The POS software then makes a DoCapture API call to the payment provider to capture the payment. The payment provider will then respond with an API response to indicate whether the funds were transferred successfully. If so, the merchant prints a receipt for the user.

Figure 2B:
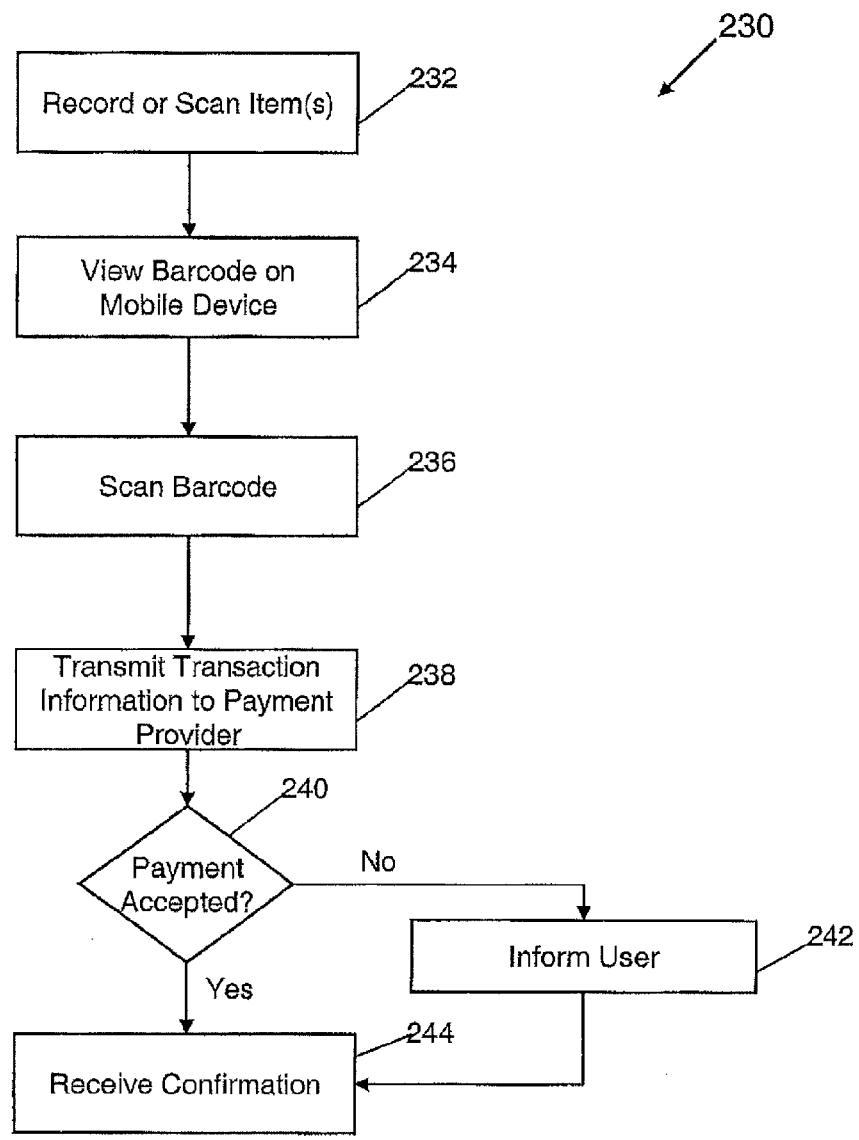
FIG. 2B is a flowchart showing steps for a merchant to perform a financial transaction from a mobile device according to one embodiment.

FIG. 2B is a flowchart 230 showing steps performed by a merchant for performing a financial transaction using a mobile device displaying a barcode, according to one embodiment. When a user of a mobile device desires to make a financial transaction with the merchant (or anyone else), the user generates and displays a barcode on the mobile device described above. This may be when the user has completed shopping is ready to check out or pay for the items at the register or point of sale. Initially, at step 232, the merchant records the items for purchase and the total amount owed by the purchaser, such as scanning the items for both a description and price. Next, at step 234, the merchant is presented with a barcode displayed on the user's or purchaser's mobile device, such as a phone. The barcode is then scanned, at step 236, either by the merchant or by the user (such as with a merchant scanner). Again, depending on the display/screen of the user device, an appropriate scanner is needed to accurately read the barcode, such as a CCD scanner. The barcode information and the purchase information are transmitted to the payment provider at step 238, which is processed by the payment provider. The merchant then receives a notification that the payment has been accepted or denied, at step 240. If denied, the merchant can inform the user at step 242, and the user can respond accordingly. Options include scanning the barcode again, generating a new barcode, or presenting the merchant with a new form of payment. If accepted, the merchant may receive a confirmation of the transaction at step 244. As a result, funds are transferred from the user's account to the merchant's account for the purchase of the desired item(s).

Figure 2C:
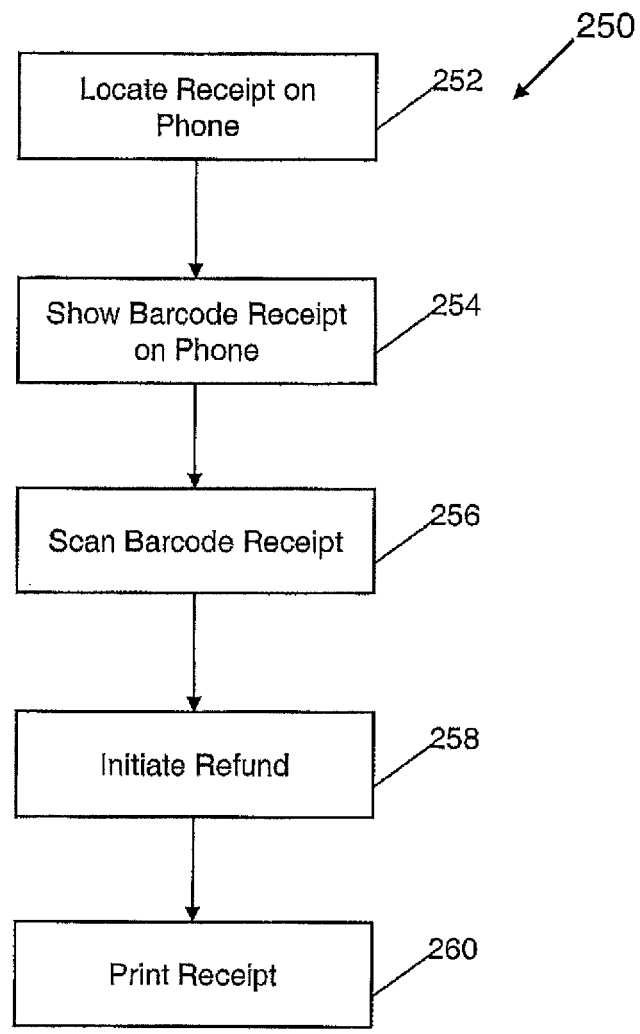
FIG. 2C is a flowchart showing steps to enable a user to obtain a refund from a receipt on a mobile phone according to one embodiment.

FIG. 2C is a flowchart 250 showing an embodiment for a user to retrieve a receipt on a mobile phone and use that for a refund at a POS. After a purchase, such as described above, the user may want to return the purchase for a refund. In step 252, the user locates the receipt on the user's mobile phone or device. The receipt may have been stored as part of the initial purchase, as described above. Retrieval of the receipt may include the application having a search menu that allows the user to locate a transaction by the merchant, dollar amount, date, or other category. The user can select the desired transaction to view details, such as item and receipt. Once the desired receipt or transaction is located, the barcode receipt is shown on the display of the mobile device in step 254. For example, a button could be added to the transaction detail page to display the merchant's order ID or invoice ID (represented by the barcode). The barcode receipt may also be displayed or generated in any other suitable manner, such as being captured and stored as a barcode during the purchasing process.

Once displayed, the merchant, at step 256, scans the barcode, as part of the refund process. Scanning of the barcode can be done before or after the merchant scans the returned merchandise. Next, at step 258, the POS software at the merchant location makes a refund API call to initiate the refund. In one embodiment, the payment provider can then determine if the transaction (refund) is proper and valid. Ways in which the payment provider can do this include confirming whether the merchant and user accounts are valid, matching up the specific merchant account with the merchant, matching up the specific user account with the user, determining whether the refunded item was truly purchased and if it was purchased at the merchant, matching the returned item to what is indicated on the receipt, any expiration date on the receipt for refunds, etc. When the refund is approved, either by the payment provider or by the merchant, the payment provider transfers the refunded amount from the merchant's account to the user's account. The payment provider then transmits an API response to indicate whether the refund was successful. If so, the merchant, at step 260, prints a receipt that shows the refund transaction. The refund receipt may also be stored on the user's phone. This embodiment enables the user to easily and effectively manage receipts and refunds, as compared to saving, storing, and categorizing paper receipts.

FIGS. 3A and 3B show one embodiment of a barcode generated from a mobile phone 300. In FIG. 3A, the user has opened up the application and is presented with a login screen 302. Login screen 302 includes a phone field 304, which may or may not be populated with the device phone number, and a password or PIN field 306, where the user enters his or her PIN, such as using the phone keys. After a successful login, the user is shown a screen with a barcode 308, which may only be valid for a certain time period and for a single use. The barcode shown on the screen can then be scanned for payment at a POS, as described above.

Figure 4:
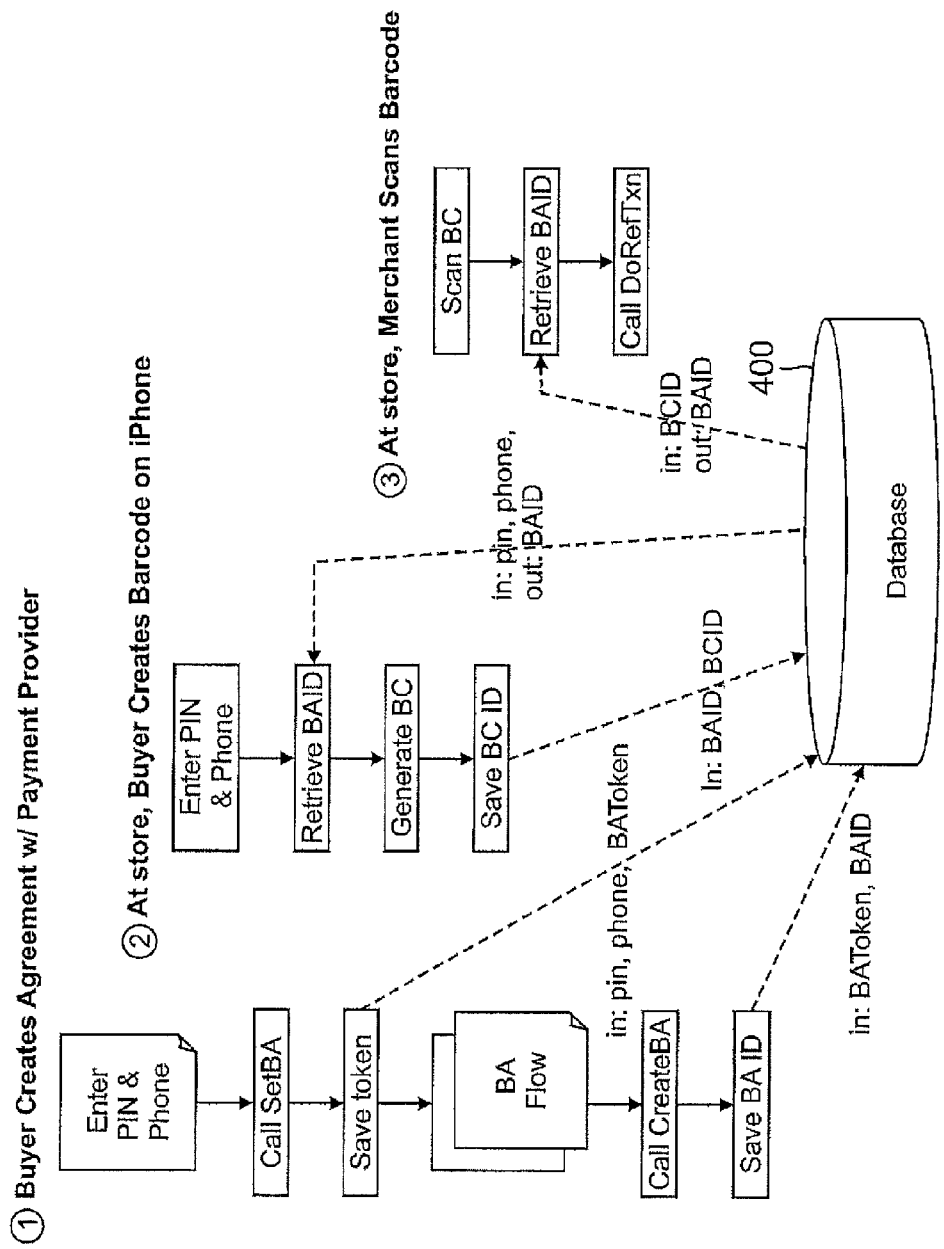
FIG. 4 is a system diagram showing various steps performed by different parties to a payment transaction using a mobile device according to one embodiment.

FIG. 4 is a diagram showing various steps performed by different parties to a payment transaction using a mobile device according to one embodiment. Path 1 illustrates steps taken by a buyer to register with the payment provider or create an account with the payment provider. Selected information, such as the PIN, phone number, agreement token, and agreement ID are stored in a database 400 of the payment provider. Database 400 may be stored on a local or remote server or any other suitable storage means. Path 2 shows steps for the buyer when he is ready to make a purchase at a store or POS. The user PIN and phone number are searched in database 400 to find the matching user ID. The barcode is generated, with an associated barcode ID. Both the user ID and barcode ID are stored in database 400. Path 3 shows steps for the merchant after the barcode is generated in path 2. After scanning the barcode, the barcode ID is checked in the database with a matching user ID. When confirmed, the user ID is transmitted to the merchant for confirmation of payment.

Figure 5A:
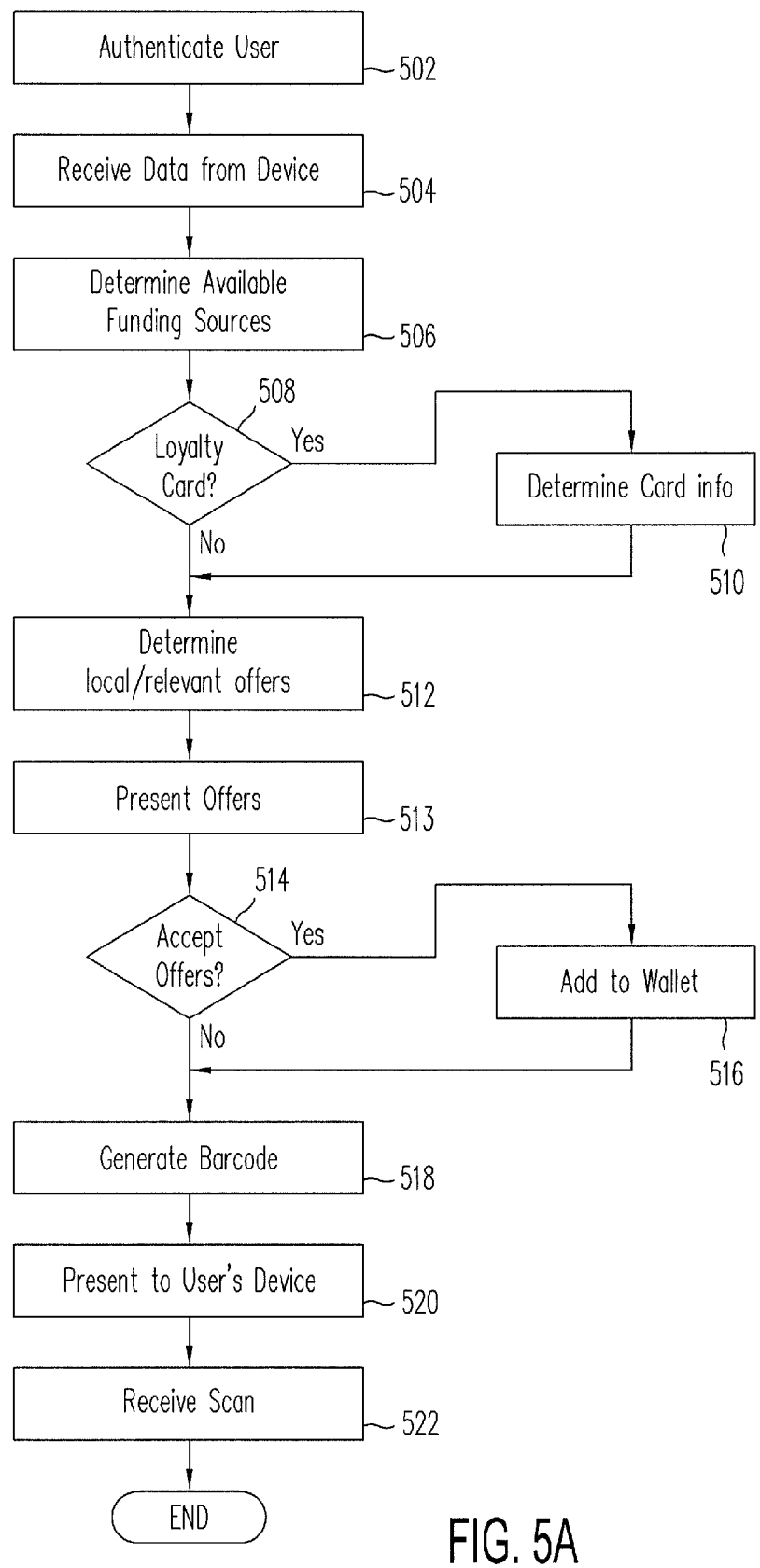
FIGS. 5A and 5B are flowcharts showing steps illustrating a user experience and a merchant/payment provider experience, respectively for using a barcode for payment according to other embodiments.

FIG. 5A is a flowchart 500 showing an embodiment where the barcode contains a plurality of funding sources or instruments for use in a transaction. Flowchart 500 illustrates a consumer experience. The user with a mobile device may have entered a merchant store or at a location near one or more merchant stores. The user may launch an app from the mobile device, which requests the user to enter specific authentication information, such as PIN/password, user name, phone number, email, etc. The user enters the requested information into the mobile device, and in step 502, the payment provider processes the information to authenticate the user. For example, the payment provider determines whether an active account exists with the payment provider corresponding to the user and the information provided by the user.

Next, in step 504, the payment provider receives additional data from the mobile device, such as geo-location and user identification. Using the information received, the payment provider may determine available funding sources for the user in step 506. This may include determining which merchants are near the user/mobile device and which funding sources are available from the merchants Note that funding sources as used herein may include anything used as part of a purchase, such as, but not limited to, coupons, gift cards, rebates, credit cards, debit cards, store credit, account credit, discounts, incentives, loyalty points, and the like.

Determining available funding sources may also include determining what funding sources the user has associated with the user's account. Not all account funding sources may be available though, as some funding sources may not be able to be used with the local merchant(s), have other restrictions, such as not yet in the redemption period, not for a particular location or branch, etc.

In step 508, a determination is made whether the user has a loyalty card, club membership, or reward card with the local merchant(s), such as by checking whether any loyalty cards are associated with the user account or wallet and if so, whether any of those cards are for the identified local merchant(s). If so, the card information (e.g., name on card and card number) is determined in step 510.

In step 512, local and/or relevant offers are determined. Offers may include ones specific to the merchant, to the user, to a specific type of product, to a specific manufacturer, or the like. The determination may be based on the user's geo-location, merchant incentives/promotions, user's funding source, and loyalty card information.

In step 513, offers determined in step 512 are presented to the user, such as on the user device display. The offers may be include a brief description or a more detailed description. For the former, the user may select the offer to view more details about the offer.

In step 514, the user may choose one or more offers to accept. The user may decide not to accept any offer or may choose to accept all offers presented as well. Selection may be accomplished through the user clicking on or otherwise selecting a box or other indicator corresponding to the offer.

Any accepted offers are added to the user's wallet in step 516. The user may be able to view offers directly through the user's mobile device or through the user's account with the payment provider, such as through the payment provider site.

The user may then shop or continue shopping at a merchant store. When ready to checkout, the payment provider generates a barcode (such as a QR code) in step 518. The barcode and processing can have the same, some, or similar features of the barcodes and processes described in other embodiments above. The barcode contains funding source information as well as any loyalty cards associated with the particular merchant. In addition, any offers or incentives accepted by the user may also be included in the barcode information. Note that the barcode can be generated at different times in different embodiments. For example, the user may be ready to checkout (such as by tapping or otherwise selecting an appropriate button or link on the user device) when the user has finished shopping, but before a first item is scanned. Thus, "Ready to checkout" may be prior to the scanning process, during the scanning process, or after all items have been scanned. Once scanned, the payment provider receives transaction information, such as through the merchant POS device or other device like a PC, tablet, or smart phone. The transaction information may include merchant identification information, user identification information, total price, individual item descriptions, etc. Note that the some of the transaction information may be communicated to the payment provider at different times and need to be at the same time as when all items are scanned.

The barcode is then communicated to and displayed on the user device in step 520. The user can present the displayed barcode to the merchant or place the display in front of a scanning device. The merchant can then scan the barcode or have the barcode scanned, in step 522, on the mobile device. The scan be through a scanner associated with the merchant POS or other device. For example, if a merchant or other payment recipient can scan the barcode with a smart phone, tablet, or other computing device capable of scanning a barcode and communicating the information to the payment provider.

Figure 5B:
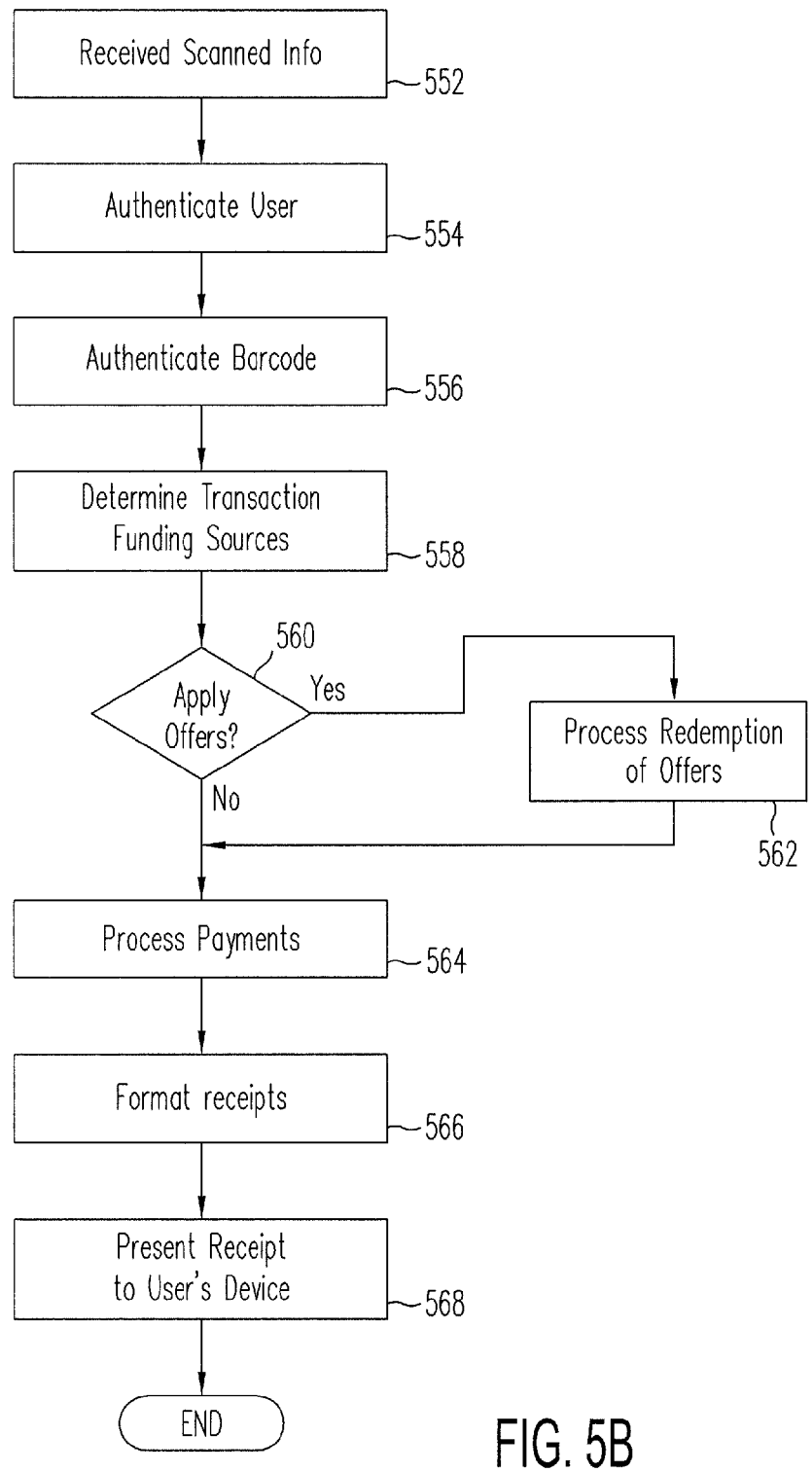

FIG. 5B is a flowchart 550 showing an embodiment where the barcode contains a plurality of funding sources or instruments for use in a specific transaction. Flowchart 550 illustrates a merchant and/or payment provider experience. Continuing from step 522 in FIG. 5A, the payment provider receives information contained in the scanned barcode, such as through a communication with the scanning device (e.g., the POS device, smart phone, tablet, etc.). Information contained in the scan includes transaction details, including funding sources, loyalty cards, and offers, as well as merchant information, such as a merchant identifier, merchant name, merchant location, and the like.

Using the information, the payment provider authenticates the merchant in step 554. Authentication may include determining whether the merchant has a valid account with the payment provider, based in part on the merchant identifier. Other information may also be used to authenticate the merchant, such as whether the transaction information matches goods sold by the merchant, the location of the scan matches with a confirmed merchant location, and other authentication measures.

The payment provider also authenticates, in step 556, the barcode from the received scanned information. For example, the payment provider may determine whether the barcode is valid (e.g., whether the barcode is associated with the user account), whether the funding sources can be used with the purchase, such as limits exceeded or restrictions placed, and risk/fraud analysis processing. For example, the user may have set an upper limit on the amount that can be purchased through the generated barcode. Thus, if the total payment exceeds that amount, the transaction may be denied, or the user may be informed that a different funding source, such as a credit card, will be needed to fund the amount over the barcode approved amount. After applying any discounts, coupons, gift cards, etc., a total is obtained and the amount is debited from the user's account(s) and/or funding sources as applicable.

Based on the received information, such as the transaction information, location (user and/or merchant), and user information, the payment provider determines, in step 558, which funding sources to use for the current transaction. In particular, the payment provider may determine the best or suggested mix of funding sources for the transaction, which can be based on user settings, user preferences, merchant information, transaction amount, transaction location, expiration of funding sources, etc. For example, a store discount or gift card that will be expiring soon may be part of the funding sources for the transaction. Details of different ways to determine funding sources to use may be found in commonly-owned U.S. patent application Ser. No. 13/330,264, file Dec. 11, 2011, which is incorporated by reference in its entirety. This step (or a separate step) may also determine any reward or club membership numbers for the merchant. The funding sources may only be suggested funding sources that the user can approve or revise as desired.

In step 560, a determination is made whether any offers contained in the barcode may be used with the purchase. For example, the payment provider may determine whether an offer corresponds to a scanned or purchased item and whether any conditions of the offer are met with the transaction.

If one or more offers may be used or applied to the purchase, the payment provider processes redemption of the offer(s) in step 562. This may include the payment provider applying the discount or incentive to the purchase to reduce an item price. Redeemed offers may be processed with entities offering the offers. For example the payment provider may notify an entity that an offer has been redeemed. The entity may then settle with the merchant or the payment provider may handle settlement between the entity and merchant as well.

Once any applicable offers are processed and/or redeemed, the payment provider processes the payment in step 564. For example, the payment provide may deduct the purchase total from one or more user funding sources and credit a purchase amount to an account of the merchant.

When the payment processing is completed, the payment provider may format a receipt for the transaction in step 566. The receipt may list all items purchased, any discounts, offers, or incentives applied to each eligible purchase, funding source(s) used, transaction date and time, transaction location, merchant information, and any other desired information.

The receipt may then be presented to the user device in step 568, which can be stored in the user account or digital wallet on the phone as discussed herein. The payment provider may also send receipt data to the merchant, which may allow the merchant to store transaction details and/or print a physical receipt for the user.

Thus, barcode enables the user to have the barcode scanned by a POS device, manned or unmanned, or even by a smart phone (allowing small merchants or payees to process barcode payments), to quickly and easily make a payment. Because the barcode contains a plurality of funding sources, including offers and incentives, and/or loyalty/reward/membership numbers, the user can pay more intelligently and convey different types of information in a single barcode.

Figure 6:
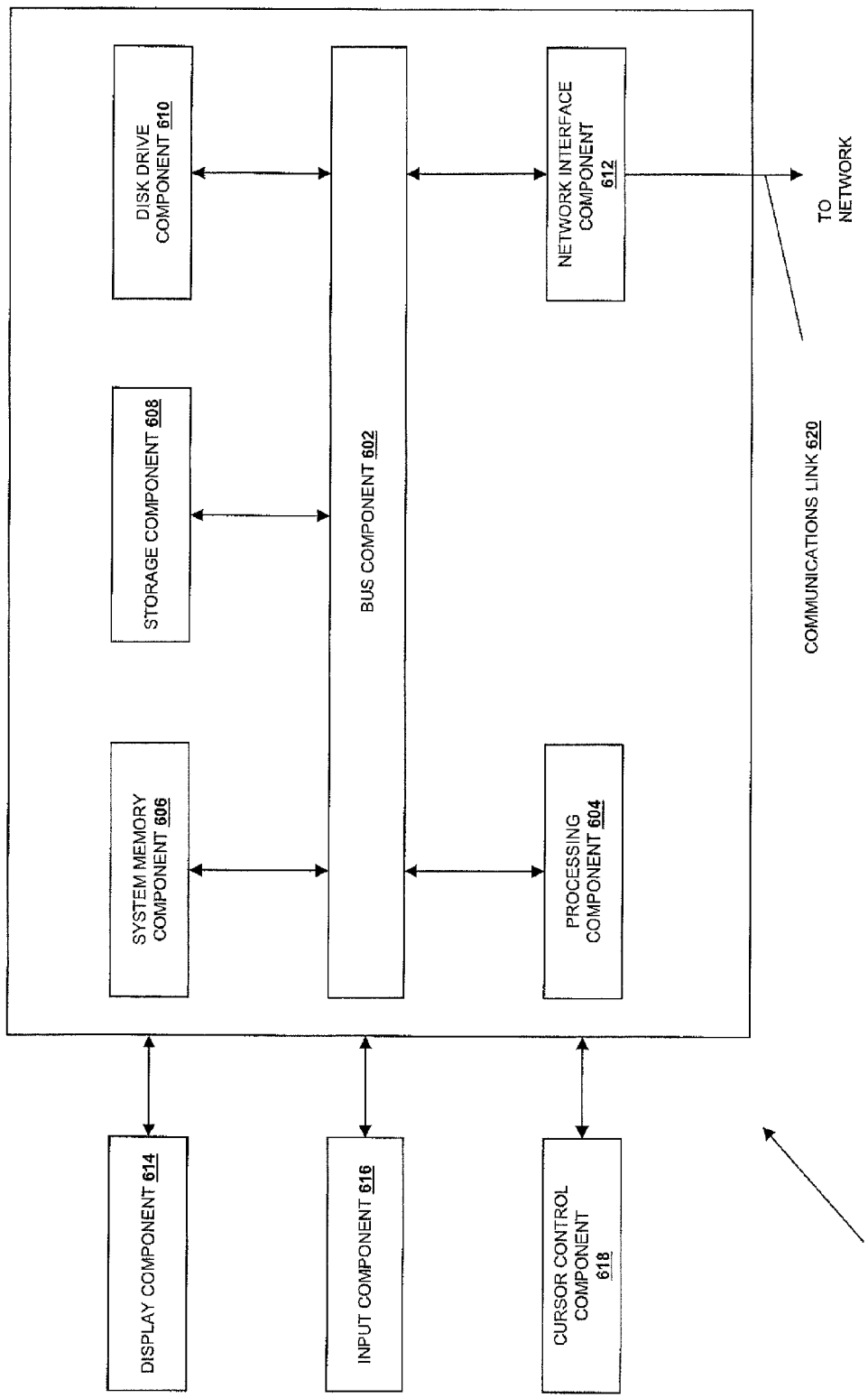
FIG. 6 is a block diagram of one embodiment of a system that can be used to implement one or more components of the system described herein.

FIG. 6 is a block diagram of a computer system or device 600 according to one embodiment, which may be suitable for implementing embodiments of various aspects of this disclosure. In various implementations of embodiments, device 600 may comprise a personal computing device, such as a personal computer, laptop, PDA, cellular or smart phone, a computing tablet, or other personal computing or communications devices. Database 400 may be within, part of, or comprise a network computing device, such as one or more servers, computer or processor combined to provide the payment services. Thus, it should be appreciated that the devices described herein may be implemented as computer system 600 in a manner as follows.

In one embodiment, computer system 600 may include a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD for displaying the generated barcode), an input component 616 (e.g., keyboard or keypad for entering a PIN or password), and/or a cursor control component 618 (e.g., keys, mouse, or trackball). In one embodiment, disk drive component 610 may comprise a database having one or more disk drive components. Network interface component 612 may include an antenna, either separate or integrated, to enable transmission and reception via communication link 620.

Computer system 600 may perform specific operations by processor 604 executing one or more sequences of one or more instructions contained in system memory component 606, according to steps described above. Such instructions may be read into system memory component 606 from another computer readable medium, such as static storage component 608 or disk drive component 610. The various storage or memory components may be used to store information about trusted sources for the quick-approval process. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 600. In various other embodiments, a plurality of computer systems 600 coupled by communication link 620 may perform instruction sequences to practice the invention in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, entry of a user PIN with associated phone number may create a virtual debit card with a corresponding barcode. The barcode can then be scanned for normal debit card processing. Other examples include generation of barcodes corresponding to coupons, gift cards, or virtually any financial instrument. Furthermore, the generation and scanning of the barcode can be at any time during the transaction, such as before, during, or after items are scanned or otherwise recorded.

Having thus described embodiments of the invention, persons of ordinary skill in the art will recognize that changes may be made in form and detail without departing from the scope of the invention. Thus, the invention is limited only by the claims.

I claim:

1. A system comprising:
   a memory storing account information for a plurality of users, wherein the account information comprises a user identifier, user funding sources, and barcode information for a barcode for use in a transaction, wherein the user funding sources are selected from a group comprising credit cards, debit cards, gift cards, and store credit accounts; and
   a payment service provider comprising a computer processor communicatively coupled to the memory and configured to:
     receive information about a user account and information about a merchant or location from a user device;
     automatically determine a first plurality of funding sources available for use by the user based on the information received about the user account and the information received about the merchant or location;
     communicate a second plurality of funding sources from the first plurality of funding sources to the user device;
     receive a selection from the user of at least two funding sources from the second plurality of funding sources for completing funding of the transaction with the merchant;
     generate a barcode containing the at least two funding sources of the second plurality of funding sources for display on the user device;
     receive information contained in the barcode from the barcode being scanned on the user device by a merchant point of sale device; and process the payment based, at least in part, on the received information contained in the barcode, wherein the processing of the payment includes at least a debit from each of the at least two funding sources of the plurality of funding sources.

2. The system of claim 1, wherein the computer processor is further configured to:
receive information about the transaction; and
automatically determine the first plurality of funding sources available for use by the user based further on the information received about the transaction.

3. The system of claim 1, wherein the second plurality is less than the first plurality.

4. The system of claim 1, wherein the barcode is generated prior to a first item in the transaction being scanned.

5. The system of claim 4, wherein the barcode comprises information for one or more loyalty, reward, and/or membership numbers for a merchant receiving the payment.

6. The system of claim 1, wherein the barcode is scanned by a smart phone or computing tablet.

7. The system of claim 1, wherein the computer processor is further configured to receive a selection from the user of offers to be accepted for possible use with the payment.

8. The system of claim 7, wherein the selection is from offers presented to the user on the user device and determined by a service provider based on the information about the user account or the information about the merchant or location.

9. The system of claim 1, wherein the barcode is valid only for a single use.

10. The system of claim 1, wherein the barcode has conditions for use predetermined by the user.

11. The system of claim 1, wherein the computer processor is further configured to generate a barcode receipt for the payment.

12. The system of claim 1, wherein the first plurality and the second plurality are the same.

13. A non-transitory machine-readable medium comprising a plurality of machine-readable instructions which when executed by one or more processors of a server are adapted to cause the server to perform a method comprising:
receiving information about a user account and information about a merchant or location from a user device, wherein the information about the user account comprises at least user preferences associated with a plurality of funding sources selected from a group comprising credit cards, debit cards, gift cards, and store credit accounts;
automatically determining a first plurality of funding sources available for use by the user based on the information received about the user account and the information received about the merchant or location;
communicating a second plurality of funding sources from the first plurality of funding sources to the user device;
receiving a selection from the user of at least two funding sources from the second plurality of funding sources for completing funding of the transaction with the merchant;
generating a barcode containing the at least two funding sources of the second plurality of funding sources for display on the user device;
receiving information contained in the barcode from the barcode being scanned on the user device by a merchant point of sale device; and
processing the payment based, at least in part, on the received information contained in the barcode, wherein the processing of the payment includes at least a debit from each of the at least two funding sources of the plurality of funding sources.

14. The non-transitory machine-readable medium of claim 13, wherein the method further comprises:
receiving information about the transaction; and
automatically determining the first plurality of funding sources available for use by the user based further on the information received about the transaction.

15. The non-transitory machine-readable medium of claim 13, wherein the second plurality is less than the first plurality.

16. The non-transitory machine-readable medium of claim 13, wherein the barcode is generated prior to a first item in the transaction being scanned.

17. The non-transitory machine-readable medium of claim 13, wherein the barcode comprises information for one or more loyalty, reward, and/or membership numbers for a merchant receiving the payment.

18. The non-transitory machine-readable medium of claim 13, wherein the barcode is scanned by a smart phone or computing tablet.

19. The non-transitory machine-readable medium of claim 13, wherein the barcode comprises information for one or more offers selected by a user from a plurality offers presented to the user on the user device.

20. The non-transitory machine-readable medium of claim 13, wherein the barcode has conditions for use predetermined by the user.

21. A mobile communication device for performing a transaction, comprising:
an antenna programmed to communicate with a remote on-line client;
a computer processor programmed to:
communicate, via the antenna to the remote on-line client, information about a user account and information about a merchant or location, wherein the information about the user account comprises at least user preferences associated with a plurality of user funding sources, wherein the plurality of user funding sources are selected from the group comprising:
credit cards, debit cards, gift cards, and store credit accounts; and
display a barcode, originated by the on-line client, for completing funding of the transaction, wherein the barcode comprises a selection of at least two user funding sources of a plurality of user funding sources automatically determined to be available by the on-line client in response to receiving the information about the user account and the information about the merchant or the location;
a memory programmed to store information about the financial transaction; and
a display programmed to:
display the barcode and allow the barcode to be scanned at a merchant point of sale device for processing by the remote on-line client; and
display a notification of an authorized payment to the merchant that includes at least a debit from each of the at least two funding sources of the plurality of user funding sources.

* * * * *